(12) United States Patent
Jännetyinen

(10) Patent No.: US 6,416,629 B1
(45) Date of Patent: Jul. 9, 2002

(54) ARRANGEMENT FOR FASTENING PRESS JACKET TO PRESS ROLL END

(75) Inventor: Jari Jännetyinen, Siuro (FI)

(73) Assignee: Tamfelt Oyj ABP, Tampere (FI)

( * ) Notice: Subject to any disclaimer, the term of this patent is extended or adjusted under 35 U.S.C. 154(b) by 0 days.

(21) Appl. No.: 09/717,249

(22) Filed: Nov. 22, 2000

Related U.S. Application Data

(63) Continuation-in-part of application No. PCT/FI99/00445, filed on May 24, 1999.

(30) Foreign Application Priority Data

May 25, 1998 (FI) .................................................. 981150

(51) Int. Cl.$^7$ .............................. D21F 3/00; B05C 11/00
(52) U.S. Cl. ............................... 162/358.1; 162/358.2; 492/20; 492/38; 492/48
(58) Field of Search ............................ 29/131, 116.2, 29/117; 492/30, 37, 48, 38, 55, 20; 100/118, 153; 162/358.1, 358.3, 272

(56) References Cited

U.S. PATENT DOCUMENTS

| | | | |
|---|---|---|---|
| 3,318,233 A | * | 5/1967 | Curtis |
| 3,710,470 A | * | 1/1973 | Krake ........................ 29/131 |
| 4,625,376 A | * | 12/1986 | Schiel et al. |
| RE33,034 E | * | 8/1989 | Schiel et al. ................ 241/119 |
| 4,878,281 A | * | 11/1989 | Flamig et al. |
| 5,003,854 A | * | 4/1991 | Capdebsco ................... 83/331 |
| 5,084,137 A | * | 1/1992 | Iimarinen et al. ........... 162/272 |
| 5,098,523 A | * | 3/1992 | Iimarinen et al. ........... 162/358 |
| 5,141,601 A | * | 8/1992 | Karlsson et al. ......... 162/358.3 |
| 5,216,954 A | * | 6/1993 | Thompson ................... 101/375 |
| 5,342,277 A | * | 8/1994 | Steiner et al. ................ 492/56 |
| 5,904,813 A | * | 5/1999 | Bengtsson et al. ....... 162/358.3 |

FOREIGN PATENT DOCUMENTS

| | | |
|---|---|---|
| FI | 85 167 | 11/1991 |
| FI | 87 094 | 8/1992 |
| JP | 63-37610 | 12/1994 |

\* cited by examiner

*Primary Examiner*—Peter Chin
*Assistant Examiner*—Carlos Lopez
(74) *Attorney, Agent, or Firm*—McDermott, Will & Emery

(57) ABSTRACT

An arrangement for fastening a press jacket to a press roll end. In the arrangement, thinnings are formed at an edge of the press jacket and the press jacket is fastened to the roll end by means of holes formed at the edge of thicker jacket portions between the thinnings.

4 Claims, 2 Drawing Sheets

ARRANGEMENT FOR FASTENING PRESS JACKET TO PRESS ROLL END

This application is a c-i-p of PCT/FI99/00445 filed May 24, 1999.

BACKGROUND OF THE INVENTION

1. Technical Field

The invention relates to an arrangement for fastening a press jacket to an end of a press roll, whereby an edge of the press jacket is bent over the edge of the press roll end, onto its end surface, and the jacket is pressed by means of separate fastening segments against the surface of the roll end, and whereby openings are formed in the press jacket for fastening bolts of the fastening segments, to allow the fastening bolts to extend through the openings to the press roll end, and holes are formed at the edge of the press jacket for the jacket to be tightened in its place before the fastening segments are tightened into place.

2. Description of the Related Art

Press rolls are used, to some extent, in a press section of a paper machine. A flexible press jacket is fastened to the ends of the roll, the jacket rotating with the ends to provide a press nip or a zone against a counter roll. Within a press roll jacket of this type there is also a body going through the roll, the body being either stationary or a body part rotating with the roll. This kind of a solution is disclosed for instance in Finnish Patent 85 167.

A problem in prior art solutions is that the press jacket needs to be symmetrically and co-axially fastened to the roll ends in order to obtain a well-functioning roll structure. However, when a press jacket made of a relatively hard material, such as polyurethane or the like, is used, it is difficult to fasten the jacket because urethane is a fairly stiff material and does not bend easily. It is therefore difficult to have the press jacket centered and to form a sealed structure when a structure is to be obtained in which the press jacket and the ends are arranged to form together a sealed structure which would not, for instance, allow the lubricant inside the press jacket, between the jacket and the roll body, to be pressed out.

The solution disclosed in Finnish Patent 85 167 comprises evenly spaced pin-shaped projections or bolts arranged at a given radius on the outer end surface at the roll end and dozens of tongues formed at the edge of the press jacket, with groove-shaped openings, into which the projections fit, between the tongues. In the solution concerned, said dozens of tongues are used to tighten the press jacket edge so that the projections press against the groove bases between the tongues, thus centering the press jacket in relation to the roll end. A sealed structure with respect to the roll end is, in turn, obtained by means of segments fastened to the roll end, the segments pressing the press jacket edge bent towards the roll axle against the roll end.

A problem in the solution in question is that, in practice, the dozens of fastening tongues are difficult to fasten and handle when the press jacket edge is being fastened and, should the tongues be fastened in an incorrect order, the jacket becomes unsymmetrically and unevenly fastened. It is also difficult and time-consuming to draw a jacket edge comprising dozens of tongues in its place over the roll body and the roll ends, especially when the ends are crossed.

SUMMARY OF THE INVENTION

An object of the present invention is to provide an arrangement for fastening the jacket to the press roll end in such a way that the above mentioned problems are avoided and a simpler and easier handling of the press jacket is provided. The arrangement of the invention is characterized in that thinnings are formed at regular intervals at the edge of the press jacket, said intervals being such that the fastening bolts of the fastening segments are always positioned at one of the thinnings; that the holes at the edge of the press jacket are formed between said thinnings in unthinned edge portions of the press jacket, aligned substantially at the same position in the axial direction of the press jacket; that, when the press jacket is mounted onto the press roll end, the jacket edge is fastened to the press roll end by means of said holes, at predetermined intervals on the circumference around the roll axle, by using fastening members going through said holes; and that said openings formed for the fastening bolts are holes formed at respective thinnings, the width of the holes in the axial direction of the press jacket being such that, when the press jacket is mounted in its place, the fastening bolts do not touch the hole edges in the radial direction of the roll end.

An essential idea in the invention is that in the edge zone of the press jacket end are formed fastening holes at regular intervals, the holes allowing the jacket edge to be centrally fastened in a simple manner for instance to pins fixed to the roll end portion beyond the fastening segments. Another essential idea in the invention is that the press jacket edge is thinned between the fastening holes so that when the press jacket is tightened by means of the fastening segments against the roll end, the material in the thinned portion can press into the space provided by the thinning in such a way that folds, or the like, thicker than the original thickness of the jacket are not formed at the fastening segments. Unexpectedly, it was observed that the use of both separate guiding pins or bolts and fastening holes at the ends of the tongues causes mounting problems, which can be avoided by using only fastening holes at the edges, the holes being engaged with correctly positioned fastening pins. It was also unexpectedly observed that it is not necessary to form separate tongues by cutting. Instead, it is sufficient that the press jacket is thinned at the fastening segments, so they do not cause folded portions thicker than the press jacket, whereby a sealed, easily mountable whole can be obtained. Consequently, it is also possible to provide wider holes for the fastening bolts, so the press jacket does not rest against the bolts and the jacket sets more naturally and freely into a correct position.

An advantage of the invention is that when the edge of the press jacket is formed in a manner according to the invention, problems caused by the handling of separate tongues are avoided. Further, the edge of the press jacket can be, when necessary, cut at some points of the thinnings to form a few broader tongues that have, however, said thinned portion between the fastening holes. A further advantage of the invention is that separate grooves and projections adjusted to the grooves are not needed for the centering of the press jacket, because the holes formed at the edge of the jacket and the fastening pins at the roll end allow the jacket to be centered with a sufficient accuracy, without additional measures being needed.

BRIEF DESCRIPTION OF THE DRAWINGS

The invention will be described in greater detail in the attached drawings, in which.

DETAILED DESCRIPTION OF THE PREFERRED EMBODIMENTS

Figure 1:
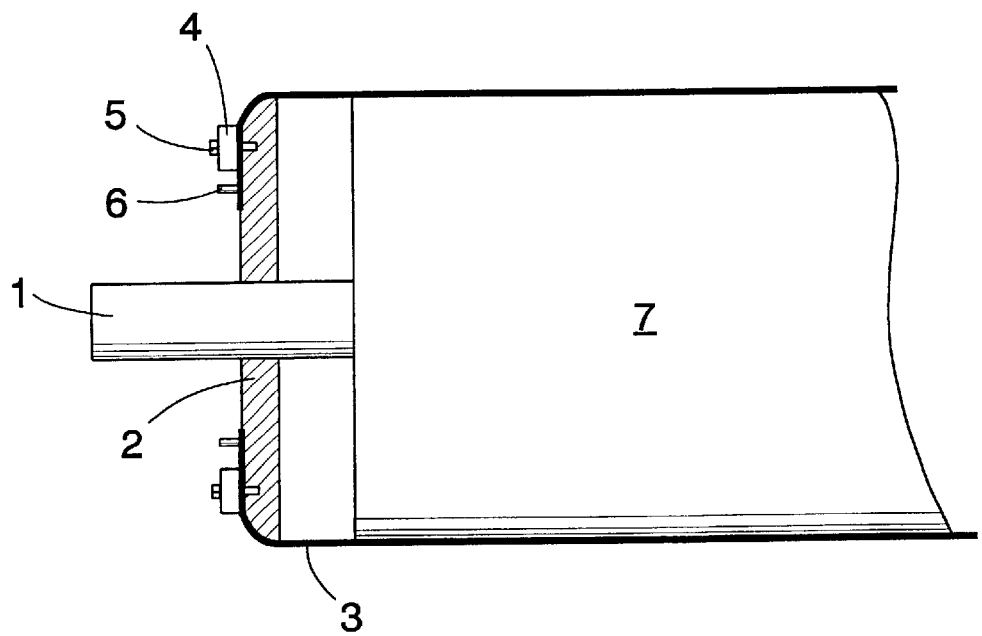
FIG. 1 is a schematic illustration of a cross-section of a press roll end.

FIG. 1 is a schematic illustration of a cross-section of a press roll end. The press roll comprises an axle 1, about which an end 2 rotates, To the end 2 is fastened a press jacket 3, which is tightened to seal against the end 2 by means of fastening segments 4. The fastening segments 4, in turn, are tightened into place by means of fastening bolts 5. An edge of the press jacket 3 is fastened through fastening holes shown in FIG. 2 to fastening pins 6 fixed to the roll end 2, on the circumference around the roll axle. Inside the roll there is also a body part 7, which is shown only as a schematic piece in the Figure. The body part 7 can either rotate about the axle 1 or it can be stationary in relation to it, the body 7 and the press jacket 3 having in that case a slide shoe structure between them. Both the body types and various slide shoe structures are known per se and they are therefore not described here in any greater detail. To apply or use any known body structure is also, as such, obvious to one skilled in the art.

Figure 2:
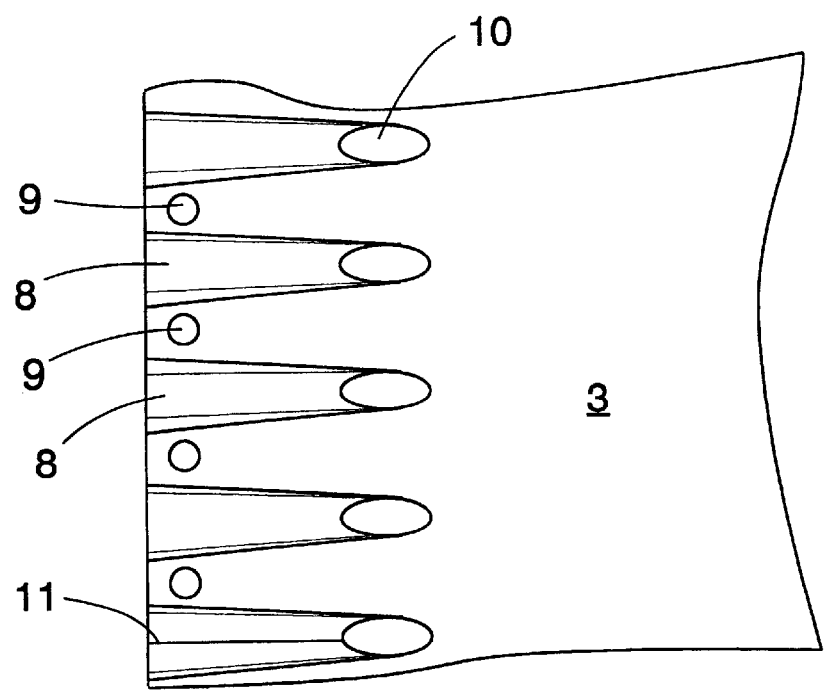
FIG. 2 is a schematic illustration of a portion of a press jacket edge.

FIG. 2 is a schematic illustration of a portion of a press jacket edge seen from above. As the Figure shows, material has been removed from the edge zone of the press jacket 3 to form thinnings 8 so that when the edge of the press jacket 3 is bent onto the end surface of the press roll, the material of the thinned portion fits into the space at the thinning, inspite of the fact that the rest of the edge becomes folded when it is bent from the outer circumference of the roll end towards the axle. The Figure also shows that at the edge of the press jacket 3, between the thinnings, fastening holes 9 are formed at regular intervals, each of the holes being meant to be engaged with a respective fastening pin 6 at the roll end. In the press jacket 3 there are also elongated holes 10 formed at the thinnings 8 in the axial direction of the jacket. The fastening bolts 5 of the fastening segments 4 can be pushed through the holes so that when the press jacket has been mounted in its place in the radial direction of the roll end, the bolts do not touch either of the edges of a hole 10 in the radial direction, but the press jacket 3 can, when it is being fastened in its place, freely set into a suitable position when the fastening segments are tightened into place. The Figure also schematically illustrates with a line 11 how the thinnings 8 can be cut at suitable intervals, for instance at every fifth thinning, or at suitable symmetrical intervals with respect to the press jacket edge, whereby some tongue-like edge portions are provided, each of the portions comprising a plurality of thinnings and a plurality of fastening holes. This way the edge can be fastened in a controlled manner, because there are no separate tongues that would be difficult to handle.

Figure 3:
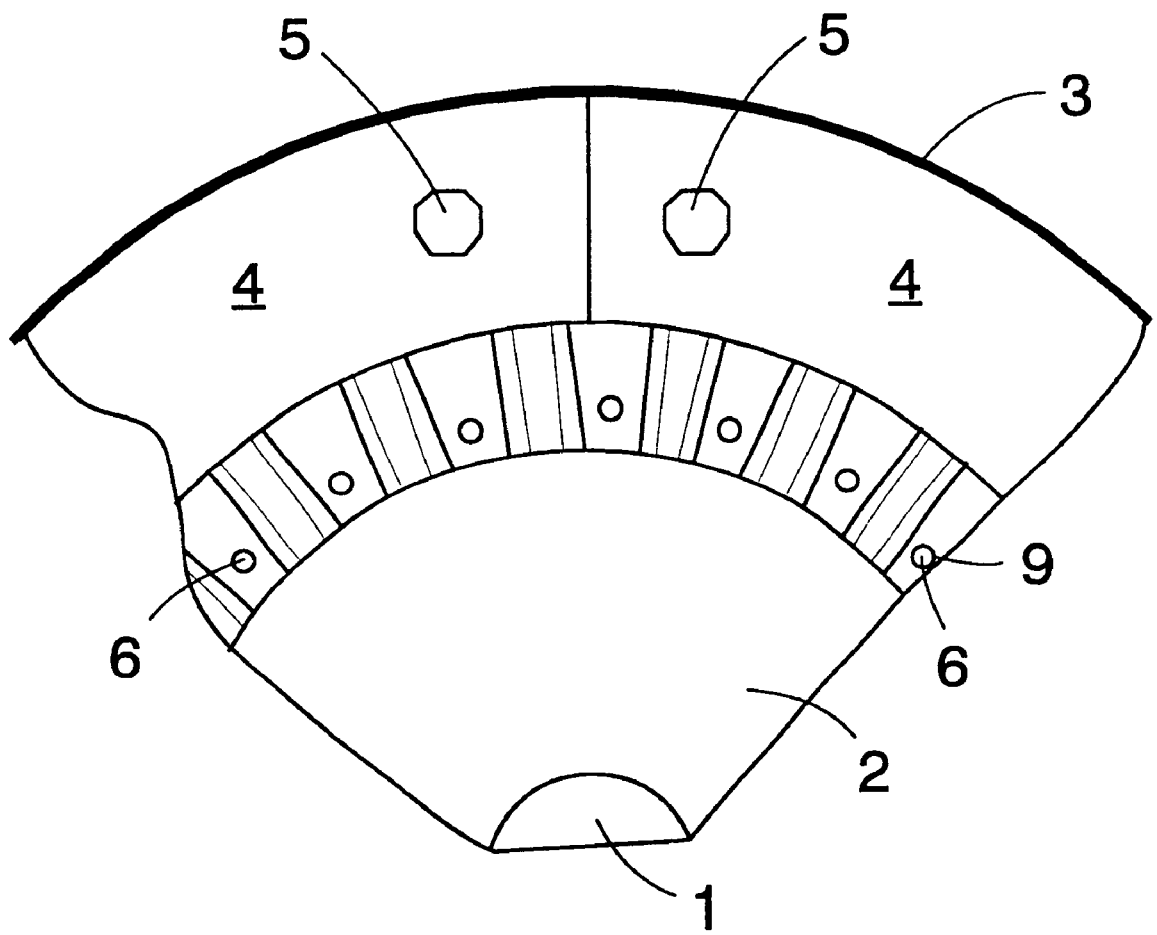
FIG. 3 is a schematic illustration of a portion of the press roll end, seen from an axial direction of the press roll, the press jacket being fastened to the roll end according to an arrangement of the invention.

FIG. 3 shows a portion of the roll end, seen from an axial direction of the roll end, illustrating how the press jacket 3 is fastened to the roll end 2. As shown in the Figure, each fastening hole 9 is engaged with a respective fastening pin 6. The space between the fastening pins 6 is of course smaller than the space between the fastening holes 9 at the edge of the tubular press jacket 3. As a result, the press jacket between the fastening holes 9 is folded, which would cause problems in the mounting of the fastening segments of an ordinary unthinned press jacket. In the present case, however, the amount of jacket material contained in the thinned portion is preferably smaller than the space that has been formed at the press jacket edge by the thinning. Hence the material is pressed at this point into the space at the thinning, under the fastening segments 4, which allows the fastening segments to be evenly pressed against the end 2 and a sealed joint to be formed near the edge of the roll end, between the end and the press jacket. As the Figure shows, the fastening bolts 5 of the fastening segments are positioned at an elongated hole 10 in the press jacket so that the edge of the hole 10 does not in any way rest against the bolt 5 in the radial direction of the roll end, thus allowing the press jacket 3 to freely set into its natural position guided only by the fastening pins 6 and the fastening holes 9. An essential feature regarding the thinned portion is that, at the fastening segments, the folding portion of the material can press into the space provided by the material removed in connection with the thinning. However, the portion extending from the fastening segments towards the roll axle can freely remain folded and therefore it does not need to be thinned to an equal extent. This means that in principle a thinning can be of an even depth, provided that the material that is left at the inner edge of the fastening segments substantially fits into the space available.

The press jacket is mounted by drawing it first over one roll end and the body, after which it is drawn to the other end of the roll and over the end. Since at least one of the roll ends can be moved in the axial direction of the roll, the movable end can be moved towards the other roll end for fastening the press jacket 3 as far as is needed to allow the fastening holes of the press jacket to be engaged with the fastening pins 6. The simplest way to perform this is to bend first the edge of the press jacket 3 inwards one portion at a time so that the fastening segment with its bolts can be put lightly in place to prevent the press jacket from detaching. Each of the fastening holes 9 is then engaged with the respective fastening pin, after which the fastening segment is tightened more securely in its place to ensure that the edge of the press jacket will not turn outwards anymore and become detached from the fastening pins. This is done at both ends so that all the fastening holes are engaged with their respective fastening pins, the fastening segments holding the holes in place. The movable end 2 is then moved away from the other end to the effect that the press jacket 3 tightens on the fastening pins 6 to a suitable tension, after which the fastening segments 4 are firmly tightened into place to press the edges of the press jacket against the end surfaces of the ends 2. The press jacket can thus be simply and reliably centered with respect to the ends 2 and fastened to them.

The fastening holes 9 can be made simply and easily direct through the press jacket by piercing the unthinned edge portions of the jacket. In some cases, however, it is advantageous to provide the holes with reinforcement rings, preferably made of metal, to make the rings press against the press jacket, thus reinforcing the jacket around the hole.

The above description and the drawings illustrate the invention only by way of example, the invention being in no way restricted to it. An essential characteristic of the invention is that holes are formed at regular intervals at the press jacket edges, the holes being aligned with the axial direction of the jacket and used to fasten and center the press jacket. It also essential that material is removed from the press jacket between the holes to allow the remaining material to substantially fit, when placed against the end surfaces of the roll ends, into the space left by the removed material, at least between the fastening segments and the end.

What is claimed is:

1. An arrangement for fastening a press jacket to an end of a press roll by bending an edge of the press jacket over the edge of the press roll end onto its end surface, and pressing separate fastening segments against the surface of the roll end, said press jacket containing openings formed thereon for fastening bolts of the fastening segments to allow the fastening bolts to extend through the openings to the press roll end, and said press jacket containing holes formed at the edge thereof for the jacket to be tightened in its place before the fastening segments are tightened into place, comprising:

thinnings formed at regular intervals at the edge of the press jacket, said intervals being such that the fastening bolts of the fastening segments are always positioned at one of the thinnings; and wherein:
the holes at the edge of the press jacket are formed between said thinnings in unthinned edge portions of the press jacket, and aligned substantially at a same position in an axial direction of the press jacket;

when the press jacket is mounted onto the press roll end, the jacket edge is fastened to the press roll end by means of said holes, at predetermined intervals on a circumference around an axle of the roll, by using fastening members going through said holes; and said openings formed for the fastening bolts are formed at respective thinnings, the width of the openings in the axial direction of the press jacket being such that, when the press jacket is mounted in its place, the fastening bolts do not touch the opening edges in the radial direction of the roll end.

2. An arrangement according to claim 1, wherein the depth and width of the thinnings formed at the edge of the press jacket allow, when the edge of the press jacket is bent onto the surface of the press roll end, the thinnings formed at the edge of the press jacket to fit, at least between the fastening segments and the roll end, in such a manner that the thickness of the material at the thinnings corresponds, at most, to the unthinned portion of the press jacket.

3. An arrangement according to claim 1, wherein the holes formed at the edge of the press jacket are provided with reinforcement rings.

4. An arrangement according to claim 1, wherein the fastening members going through the holes formed at the edge of the press jacket are pin-like members fixed to the surface of the press roll end.

* * * * *